(12) United States Patent
Mitta

(10) Patent No.: US 11,384,005 B2
(45) Date of Patent: Jul. 12, 2022

(54) METHOD FOR ELONGATING GLASS PREFORM FOR OPTICAL FIBER

(71) Applicant: Shin-Etsu Chemical Co., Ltd., Tokyo (JP)

(72) Inventor: Ryo Mitta, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 99 days.

(21) Appl. No.: 16/801,062

(22) Filed: Feb. 25, 2020

(65) Prior Publication Data
US 2020/0283327 A1 Sep. 10, 2020

(30) Foreign Application Priority Data

Mar. 4, 2019 (JP) .............. JP2019-038593

(51) Int. Cl.
C03B 37/012 (2006.01)
C03B 37/03 (2006.01)
(52) U.S. Cl.
CPC ........ C03B 37/0124 (2013.01); C03B 37/032 (2013.01)
(58) Field of Classification Search
None
See application file for complete search history.

(56) References Cited

U.S. PATENT DOCUMENTS

2011/0132039 A1* 6/2011 Otosaka .............. C03B 37/0124 65/435
2012/0055198 A1 3/2012 Otosaka
2012/0055199 A1 3/2012 Shimizu
2013/0186148 A1 7/2013 Otosaka
2013/0291601 A1* 11/2013 Otosaka .............. C03B 37/0126 65/377
2014/0020430 A1 1/2014 Otosaka

FOREIGN PATENT DOCUMENTS

| JP | 2002274878 A | * | 9/2002 | ......... C03B 37/0124 |
| JP | 2003335538 A | * | 11/2003 | ......... C03B 37/0124 |
| JP | 2010059033 A | | 3/2010 | |

(Continued)

OTHER PUBLICATIONS

JP2002-274878A EPO Machine Translation Performed Sep. 17, 2021. (Year: 2021).*

(Continued)

*Primary Examiner* — Lisa L Herring

(57) ABSTRACT

A method for elongating a glass preform for an optical fiber is provided for producing a glass rod having a smaller diameter by elongating the glass preform having a large diameter, the method including: when the glass preform having a tapered transparent glass portion at one end of a straight body of the glass preform and a tapered portion including an opaque glass portion at another end is elongated, prior to the elongating, cutting a part of the tapered portion including the opaque glass portion, wherein a cut surface of the part is a lower end of the glass preform; and welding the cut surface of the tapered portion to a pulling dummy connected to a pulling mechanism in a elongating apparatus, wherein the cut surface is circular and has an outer diameter ranging from 135 mm to 160 mm.

2 Claims, 3 Drawing Sheets

(56) References Cited

FOREIGN PATENT DOCUMENTS

| JP | 2012076989 A | 4/2012 |
|---|---|---|
| JP | 2013147376 A | 8/2013 |
| JP | 2014019606 A | 2/2014 |
| JP | 5766157 B2 | 8/2015 |

OTHER PUBLICATIONS

JP2003-335538A EPO Machine Translation Performed Sep. 17, 2021. (Year: 2021).*
Office Action issued for counterpart Japanese Application No. 2019-038593, issued by the Japan Patent Office dated Dec. 21, 2021 (drafted on Dec. 15, 2021).

* cited by examiner

METHOD FOR ELONGATING GLASS PREFORM FOR OPTICAL FIBER

The contents of the following Japanese patent application are incorporated herein by reference:
No. 2019-038593 filed on Mar. 4, 2019.

BACKGROUND

1. Technical Field

The present invention relates to a method for elongating a glass preform for an optical fiber, the method including heating the glass preform and obtaining a glass rod with a smaller diameter by performing an elongating process.

2. Related Art

To manufacture a quartz glass rod typified by an optical fiber preform, a method is used in which a large-sized glass preform is produced in advance and then heated and elongated using an elongating apparatus equipped with a heating furnace to obtain a glass rod having a smaller diameter. Glass rods elongated by the above-described elongating apparatus have relatively large variations in the outer diameter of, for example, ±3%. For this reason, the glass rod is precisely elongated again by the elongating apparatus, which is called a glass lathe, using a burner as a heating source and adjusted such that variations in the outer diameter of the glass rod fall within ±1% of the outer diameter required for products.

When an optical fiber is manufactured from an optical fiber preform, it is advantageous to produce the optical fiber from a larger optical fiber preform in terms of facility operation rate. Therefore, in recent years, a larger-sized optical fiber preform having a large diameter, for example, an outer diameter larger-sized than 150 mm, which is much larger than an outer diameter of 80 mm of a conventionally general optical fiber preform, has been demanded. However, for the preform having a large diameter, such as the outer diameter of 150 mm, it is difficult to adjust the outer diameter by using the glass lathe. This is because, as the heating using the burner is performed in an open atmosphere, cooling caused by heat radiation occurs simultaneously with the heating, and the effect of the cooling due to the heat radiation becomes significant as the outer diameter of the preform increases, thereby the temperature of the preform cannot be increased sufficiently. Thus, even when the preform has a large diameter, such as an outer diameter of 150 mm, variations in the outer diameter of glass rods, obtained by the elongating apparatus, need to be suppressed within ±1% required for the final product or to a variation close thereto.

In recent years, various methods have been proposed to obtain a glass rod that has high surface cleanliness with high accuracy of the outer diameter using the elongating apparatus. For example, Patent Document 1 discloses a method for elongating a glass preform at low cost with high accuracy using the glass preform manufactured through a porous glass preform by disposing a tapered portion of the glass preform including a non-sintered opaque glass portion on the lower side and a tapered portion thereof made entirely of transparent glass on the upper side, and further by welding and elongating a pulling dummy to a cut surface formed by cutting the opaque glass portion of the tapered portion disposed on the lower side.

RELATED ART DOCUMENT

Patent Document

[Patent Document 1] Japanese Patent Publication No. 5766157

SUMMARY OF THE INVENTION

Technical Problem

However, in the method disclosed in Patent Document 1, since a large amount of gas is contained in the nonsintered opaque glass portion, the contained gas expands when heated at a high temperature, resulting in a problem of occurring a crack in the opaque glass portion and causing a breakage therein. When a crack occurs, it is necessary to stop the elongating to take the glass preform out of the elongating apparatus, and perform a process cutting and removing of a crack occurrence portion by a cutter, and then return the glass preform to the elongating apparatus to elongate it again. In addition, there is another problem in which the glass preform itself is bent due to an impact upon the occurrence of the crack.

As a result, the yield and productivity are deteriorated, and further a dangerous operation, such as removal of a glass portion with a crack, needs to be performed. Moreover, Patent Document 1 discloses that when cutting at the opaque glass portion, it is desirable to cut a part of the opaque glass portion with independent bubbles, in which no continuous bubbles remain. However, it is very difficult to distinguish between the continuous bubbles and the independent bubbles in the opaque glass portion. Although there is a method for distinguishing the bubbles by immersing the part in a coloured ink in the opaque glass portion for the distinguishing, this method has a problem of increasing complicated operation steps.

The present invention has been made in view of these problems, and it is an object of the present invention to provide a method for elongating a glass preform for an optical fiber that can obtain a glass rod with a high accuracy of the outer diameter at low cost by elongating a glass preform.

Means to Solve the Problem

As a result of intensive research, it has been found that cracks caused in the opaque glass portion during elongation tend to occur in a case that the area of a cut surface of the opaque glass portion is extremely large when a part of the tapered portion including the opaque glass portion is cut. It is considered that when the opaque glass portion is extremely large, the amount of gas contained in the opaque glass portion is increased, and the gas expands when heated, thereby leading to a breakage of the opaque glass portion. To suppress cracks during the elongation, reducing the size of the opaque glass portion is effective. However, to reduce the size of the opaque glass portion, the opaque glass portion needs to be changed transformed into transparent glass by further heating during sintering compared with in the conventional case. In such a case, as mentioned above, the tapered portion may be elongated too much, or the transparent glass portion may be crystalized. Furthermore, when heating is performed in the sintering process so that the opaque glass portion as small as possible, a required time per batch increases, thus reducing the throughput, and necessitating precise, complicated manufacturing control.

A method for elongating a glass preform for an optical fiber according to one aspect of the present invention is characterized by that the method is for producing a glass rod having a smaller diameter by elongating the glass preform having a large diameter, the method including: when the glass preform having a tapered transparent glass portion at one end of a straight body of the glass preform and a tapered portion including an opaque glass portion at another end is elongated, prior to the elongating, cutting a part of the tapered portion including the opaque glass portion, wherein a cut surface of the part is a lower end of the glass preform; and welding the cut surface of the tapered portion to a pulling dummy connected to a pulling mechanism in an elongating apparatus, wherein the cut surface is circular and has an outer diameter ranging from 135 mm to 160 mm.

It is preferable that the cut surface includes a transparent glass portion and an opaque glass portion, the opaque glass portion having a circular shape, and that, assuming that x is an outer diameter of the cut surface, and y is an outer diameter of the opaque glass portion at the cut surface, a relationship between x and y satisfies the following formula 1.

$$0.0698x^2 - 19.003x + 1352.6 \leq y \leq -0.2067x^2 + 62.567x - 4620 \quad \text{[Formula 1]}$$

DESCRIPTION OF EXEMPLARY EMBODIMENTS

Figure 1:
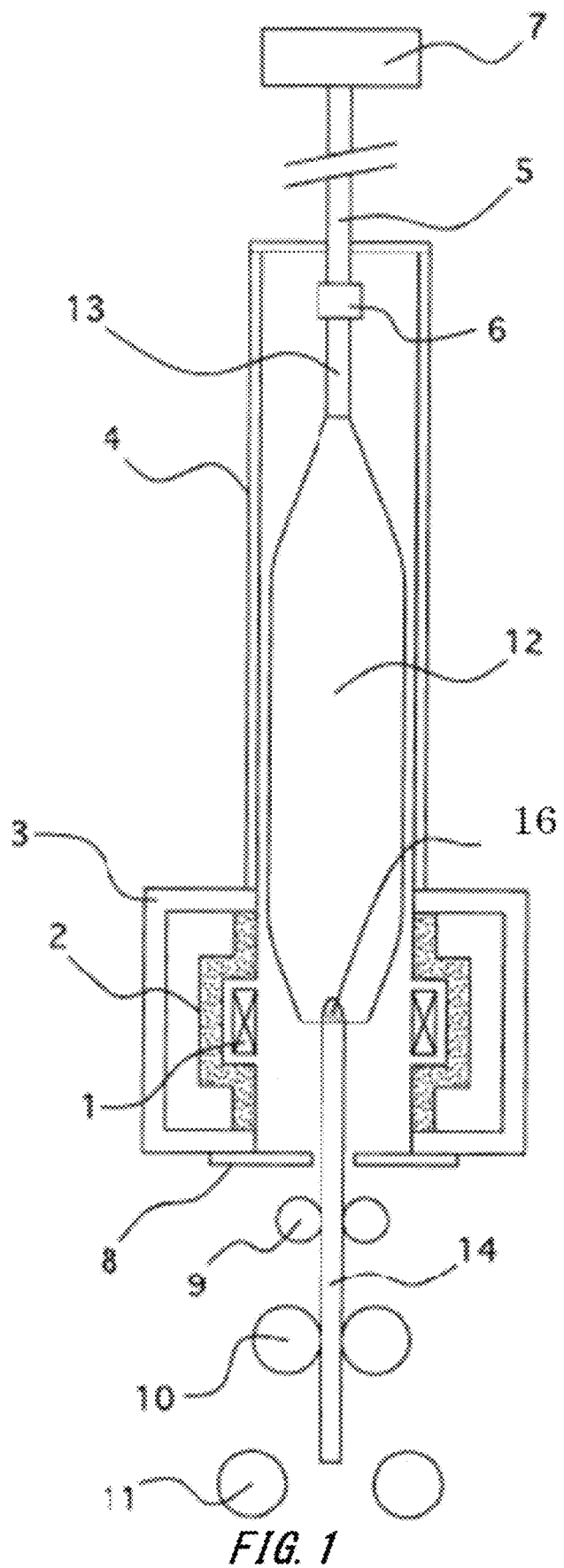
FIG. 1 is a schematic longitudinal-sectional view showing an example of a elongating apparatus.

An example of an elongating apparatus used for elongation will be described using FIG. 1. The elongating apparatus mainly includes three portions, namely, a heating furnace, a feeding portion, and a pulling portion. The heating furnace has a water-cooled chamber 3 that contains therein a heater 1 and a heat insulating material 2. A top chamber 4 is coupled to an upper portion of the water-cooled chamber 3, and a lower gas seal 8 is attached to a lower portion of the water-cooled chamber 3. The feeding portion includes a vertically movable feeding mechanism 7 provided above the top chamber 4, a suspension shaft 5 connected to the feeding mechanism 7, and a connection jig 6. The suspension shaft 5 is inserted into the top chamber 4.

The pulling portion includes guide rollers 9, pulling rollers (upper) 10, and pulling rollers 11 (lower), all of which are provided under the heating furnace and capable of gripping and releasing the pulling dummy or glass rod. The guide roller 9 is formed of a heat-resistant roller made of carbon or the like, and serves to guide the pulling dummy 14 and the glass rod to the axial center of the apparatus. The pulling rollers 10 and 11 are driven by a motor and act to pull down the pulling dummy 14 or the glass rod gripped by the pulling rollers to elongate the glass preform 12 to an appropriate diameter.

By mechanically connecting an upper end of the suspension dummy 13 provided above the glass preform to the connection jig 6, the glass preform 12 is coupled to the feeding mechanism 7 via the suspension shaft 5, so that the glass preform is vertically movable. The pulling dummy 14 is connected to a lower end of the glass preform 12. In the case of the glass preform 12 manufactured through a porous glass preform, an opaque glass portion 16 is present in one tapered portion. During the elongation, while pulling down the glass preform 12 via the feeding mechanism 7, the pulling dummy 14 is pulled down by the pulling rollers 10 and 11 at a speed higher than the speed at which the glass preform is pulled down, thus producing a glass rod having a smaller diameter, from the glass preform 12.

Such an opaque glass portion 16 that is present in the above-mentioned one tapered portion remains in a sintering step of transforming the porous glass preform into the transparent glass. The sintering step is performed to transform the porous glass preform into transparent glass sequentially from a lower part thereof in a state of suspending the porous glass preform longitudinally. Thus, when the sintering is about to reach the upper tapered portion, the whole weight of an ingot (transparent glass portion), which has been already transformed into the transparent glass, is applied onto a heated part. Then, if the upper tapered portion is intended to be completely transformed into transparent glass, the tapered portion may be excessively extended by its weight. To prevent the tapered portion from extending excessively, the opaque glass portion 16 remains in the upper tapered portion.

The elongating method of the present embodiment includes: when the glass preform having a tapered transparent glass portion at one end of a straight body of the glass preform and a tapered portion including an opaque glass portion at another end is elongated, cutting a part of the tapered portion including the opaque glass portion, wherein a cut surface of the part is a lower end of the glass preform; and welding the cut surface of the tapered portion to a pulling dummy connected to a pulling mechanism in an elongating apparatus, thereby elongating the glass preform. This elongation method has been made base on the findings that when the cut surface has an outer diameter ranging from 135 mm to 160 mm, an optical fiber preform with better appearance and accuracy of the outer diameter can be obtained while preventing the occurrence of cracks in the opaque glass portion during the elongation.

Specifically, when the outer diameter of the cut surface is smaller than 135 mm, unless excessive heating is performed during sintering, it becomes impossible to achieve the sintering step of transforming the porous glass preform in a pre-elongating step into transparent glass. The excessive heating may cause the preform to be extended excessively, or the tapered portion to be crystalized. There is a high probability that the optical properties and outer appearance of the preform will be adversely affected. In contrast, when the outer diameter of the cut surface is larger than 160 mm, sufficient heating is difficult to perform during sintering. Thus, the amount of opaque glass portion at the cut surface becomes large, and thereby the amount of gas contained in the opaque glass portion remaining in the vicinity of the cut surface is also large. This gas expands when heated at an initial stage of the elongation or the like, so that cracks are more likely to occur.

In addition to an outer diameter 18 of the cut surface ranging from 135 mm to 160 mm, when the opaque glass portion 16 is circular, and the relationship between x and y satisfies the following formula where x is the outer diameter 18 of the cut surface and y is an outer diameter of the opaque glass portion 16 at the cut surface, the occurrence of cracks can be further suppressed during the elongation. Note that the term "circular" as used in the present embodiment is not limited to a regular circle, and if it is non-circular to an extent that does not impair the function of an optical fiber preform, it falls within the category of the term "circular".

$$0.0698x^2 - 19.003x + 1352.6 \leq y \leq -0.2067x^2 + 62.567x - 4620 \quad \text{[Formula 1]}$$

When the outer diameter of the opaque glass portion 16 is so thick that it exceeds the upper limit of the above formula, even though the outer diameter 18 of the cut surface is in a range from 135 mm to 160 mm, the amount of gas contained in the opaque glass portion remaining in the vicinity of the cut surface also becomes large, whereby cracks tend to occur due to expansion of gas during heating at an initial stage of the elongation or the like. On the other hand, when the outer diameter of the opaque glass portion 16 is so small that it is below the lower limit of the above formula, regardless of the thick outer diameter of the porous glass preform, transforming the opaque glass portion into transparent glass must be performed deeply inside during the sintering step, which makes it very difficult to adjust the sintering conditions for achieving this without adversely affecting the outer appearance and optical properties. Hereinafter, the present embodiments will be described in detail based on Comparative Examples and Examples, but the present invention is not limited to the embodiments described below, and various modifications can be made within the scope of the claims.

EXAMPLES

Figure 2:
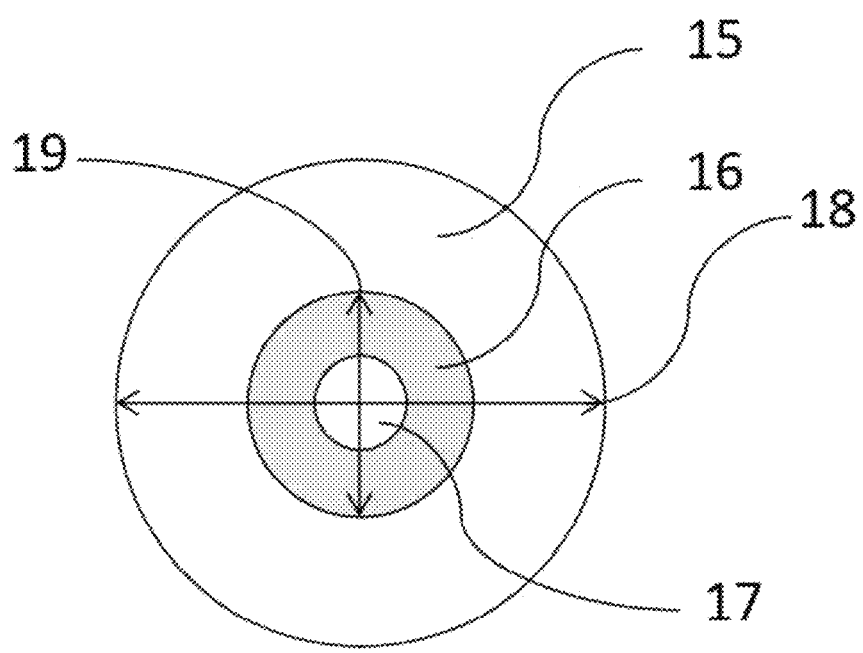
FIG. 2 is a schematic diagram showing an example of a cut surface cut at a tapered portion including an opaque glass portion.

The elongation of the glass preform was performed using the elongating apparatus shown in FIG. 1. The top chamber 4 was made of quartz glass. The tapered portion including the opaque glass portion at the lower end of the glass preform was cut at an appropriate point in advance, and the glass preform was set in the elongating apparatus with the transparent glass tapered side facing up and the tapered side including the opaque glass portion facing down. The glass preform was set such that its lower end had the same height as the center of a heater and heated so that the temperature of the heater was raised from room temperature to 2100° C. at the rate of 40° C./min. Then, the pulling dummy 14 was inserted into a heating furnace from a lower part of the elongating apparatus, and then welded and connected to the cut surface of the tapered portion including the opaque glass portion by the heater in the furnace, followed by elongation of the glass preform. FIG. 2 shows the cut surface cut at the tapered portion including the opaque glass portion, located on the lower end of the glass preform. The cut surface is mainly constituted of the transparent glass portion 15, the opaque glass portion 16, and a core rod portion 17. In the figure, the outer diameter 18 of the cut surface and an outer diameter 19 of the opaque glass portion are shown.

In the glass preform used, the length of the straight body was 2200 mm, the length of the tapered portion at each of both ends was 500 mm, and the outer diameter of the straight body was 190 mm. Elongating was performed under the condition that the target elongation diameter was 150 mm. The glass preform was produced by sintering a porous glass preform, which had been obtained by depositing glass particles through an OVD method on a target formed by connecting dummy rods on both ends of a core rod having a refractive index adjusted for a single-mode optical fiber. The tapered portion including the opaque glass portion was cut in a position at a distance of 170 mm from a joint between the core rod and the dummy rod of the glass preform on the dummy rod side. At this time, the outer diameter of the cut end and the diameter of an unmelted remaining portion of the cut surface differed depending on the shape of the glass preform and the unmelted remaining degree thereof. The side of the tapered transparent glass portion not including the opaque glass portion was cut at a position where the outer diameter of its tip end was 80 mm, a suspension dummy having an outer diameter of 40 mm was connected on a cut surface, and then the glass preform was connected to the suspension shaft 5 via the connection jig 6 and coupled to the feeding mechanism 7. Note that the glass preforms were classified by the outer diameter of the cut end of the tapered portion including the opaque glass portion before elongated, and 10 pieces of glass preforms in each of Examples 1 and 2 and Comparative Examples were prepared and elongated.

Example 1

In Example 1, an outer diameter of a cut end of a tapered portion including an opaque glass portion before elongated was set in a range from 135 mm to 160 mm.

Example 2

In Example 2, an outer diameter of a cut end of a tapered portion including an opaque glass portion before elongated was set in a range from 135 mm to 160 mm, and a diameter y of an unmelted remaining portion on the cut surface and an outer diameter x of the cut end before elongated satisfied the above formula (1).

Comparative Example 1

In Comparative Example 1, an outer diameter of a cut end of a tapered portion including an opaque glass portion before elongated was set to less than 135 mm.

Comparative Example 2

In Comparative Example 2, an outer diameter of a cut end of a tapered portion including an opaque glass portion before elongated was set to more than 160 mm.

Figure 3:
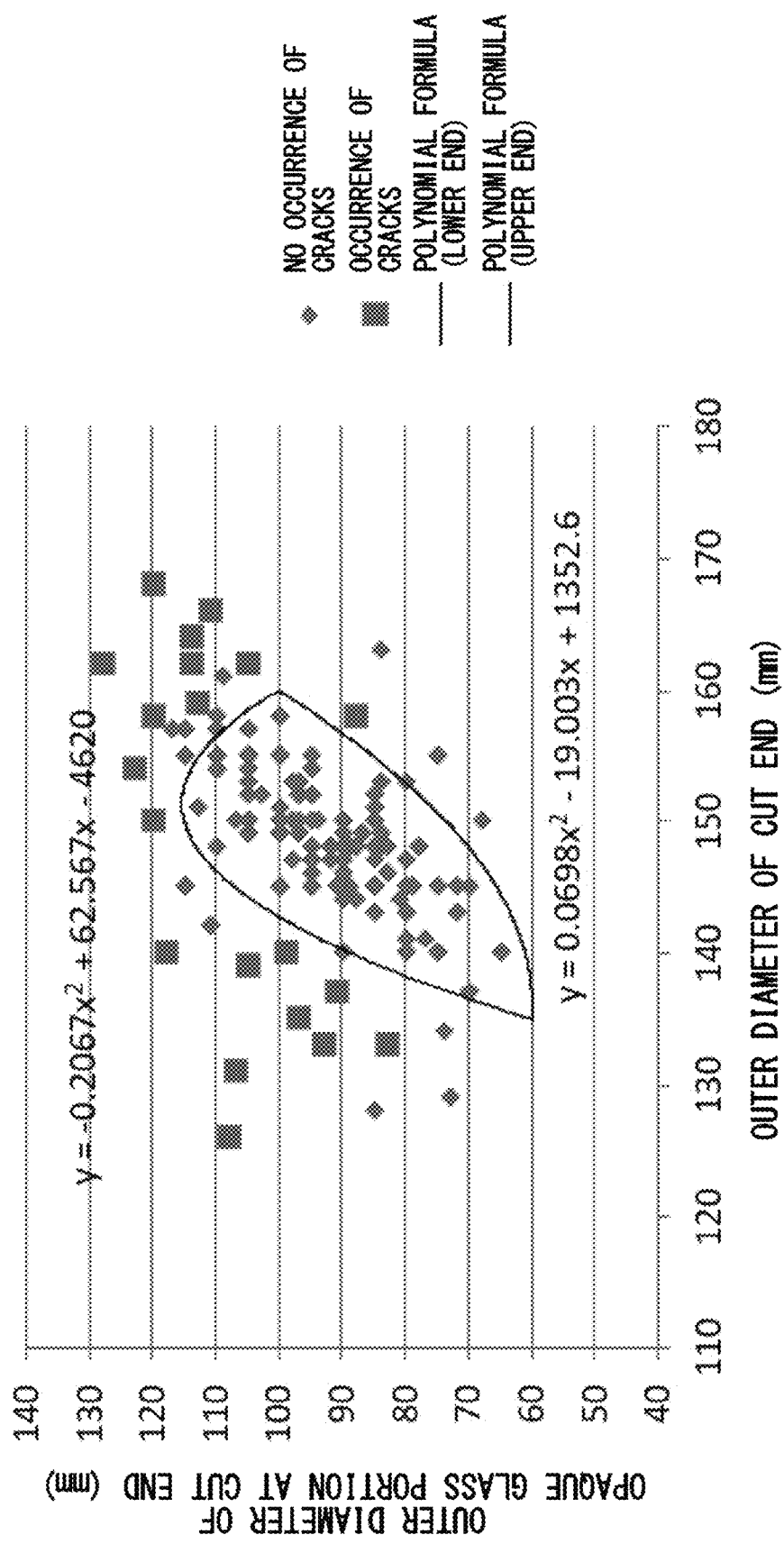
FIG. 3 is a diagram showing the relationship between an outer diameter of the cut surface (on the horizontal axis X) and an outer diameter of an opaque glass portion at the cut surface (on the vertical axis Y).

The state of occurrence of cracks during the elongating was examined, and the results thereof are summarized in FIG. 3 and Table 1. In FIG. 3, the horizontal axis x represents the outer diameter of the cut end, and the vertical axis y represents the outer diameter of the opaque glass portion at the cut end. As a result of the elongation, the crack occurrence rate of Example 1 was 7%, and the crack occurrence rate of Example 2 was 0%. A lot shown between the curve 1 represented by the following formula (2) and the curve 2 represented by the following formula (3) corresponds to the elongation in Example 2, and the glass preforms within this range can be produced by process control and throughput that cause sintering in the pre-elongating process to fall within a reasonable range.

$$y = 0.0698x^2 - 19.003x + 1352.6 \quad \text{[Formula 2]}$$

$$y = -0.2067x^2 + 62.567x - 4620 \quad \text{[Formula 3]}$$

TABLE 1

|  | Crack Occurrence Rate |
|---|---|
| Example 1 | 7% |
| Example 2 | 0% |

TABLE 1-continued

| | Crack Occurrence Rate |
|---|---|
| Comparative Example 1 | 56% |
| Comparative Example 2 | 86% |

In the case of the glass preform like that in Comparative Example 1, to fall within the range of Examples, the larger diameter side of the tapered portion which is an effective portion side of the glass preform can be cut to thicken the cut end and decrease the diameter of the unmelted remaining portion on the cut surface. Because of this, the effective portion of the preform that can be drawn is shortened. If cracks occur during the elongation of the glass preform, an elongating furnace needs to be maintained, and the effective portion is shortened further. Therefore, it is desired to cut the glass preform within the range of Examples in advance.

In the case of the glass preform like that in Comparative Example 2, the non-sintered portion is assumed to occupy a considerable part of the ingot before elongated. In this case, unless the glass preform is elongated after being subjected to a heating step again prior to the elongating so as to decrease a non-sintered portion, it can be judged that cracks would occur during the elongating, and further the optical properties of the glass rod can be adversely affected. According to the present embodiment, it is possible to easily judge that the elongation of the glass preform such as those in Comparative Examples 1 and 2 should be avoided, not by a complicated method for immersing the end surface of the glass preform in an ink, but by a simple method for measuring the outer diameter of the cut end of the tapered portion including the opaque glass portion before elongated.

In the above-mentioned Examples, the outer diameter of the straight body was 190 mm, but the above-mentioned configuration is also effective for the optical fiber preform having a large diameter of an outer diameter greater than or equal to 150 mm. This is effective when at least the outer diameter of the straight body before elongated is in a range from 150 mm to 190 mm.

According to the method for elongating a glass preform for an optical fiber of the present embodiment, the occurrence of cracks in the opaque glass portion is suppressed during the elongating performed by the elongating apparatus, thus obtaining a glass preform for an optical fiber that has good outer appearance with good accuracy of the outer diameter.

EXPLANATION OF REFERENCES

1: heater, 2: heat insulating material, 3: water-cooled chamber, 4: top chamber, 5: suspension shaft, 6: connection jig, 7: feeding mechanism, 8: lower gas seal, 9: guide roller, 10: pulling roller (upper), 11: pulling roller (lower), 12: glass preform, 13: suspension dummy, 14: pulling dummy, 15: transparent glass portion, 16: opaque glass portion, 17: core rod portion, 18: outer diameter of cut surface, 19: outer diameter of opaque glass portion

What is claimed is:

1. A method for elongating a glass preform for an optical fiber, the method being for producing a glass rod having a smaller diameter by elongating the glass preform having a larger diameter, the method comprising:

providing the glass preform including a tapered transparent glass portion at one end of a straight body of the glass preform and a tapered portion having an opaque glass portion at another end;

prior to the elongating of the provided glass preform, cutting a part of the tapered portion having the opaque glass portion to expose a cut surface having the opaque glass portion surrounded by the transparent glass portion; and welding the cut surface of the tapered portion having the opaque glass portion to a pulling dummy connected to a pulling portion of an elongating apparatus, wherein the cut surface is circular and has an outer diameter ranging from 135 mm to 160 mm;

wherein the opaque glass portion has a circular shape, and wherein assuming that x is an outer diameter of the cut surface, and y is an outer diameter of the opaque glass portion at the cut surface, a relationship between x and y satisfies the following formula:

$0.0698x^2 - 19.003x + 1352.6 \leq y \leq -0.2067x^2 + 62.567x - 4620$.

2. The method according to claim 1 wherein an outer diameter of the straight body of the glass preform is in a range from 150 mm to 190 mm.

* * * * *